United States Patent
Liu et al.

(10) Patent No.: US 10,504,451 B2
(45) Date of Patent: Dec. 10, 2019

(54) DISPLAY APPARATUS WITH MULTI SCREENS AND DISPLAY SIGNAL CONTROL METHOD THEREOF

(71) Applicant: CHAMP VISION DISPLAY INC., Miaoli County (TW)

(72) Inventors: Chin-Ku Liu, Hsin-Chu (TW); Jhong-Hao Wu, Hsin-Chu (TW); Fa-Chih Liu, Hsin-Chu (TW)

(73) Assignee: CHAMP VISION DISPLAY INC., Miaoli County (TW)

( * ) Notice: Subject to any disclaimer, the term of this patent is extended or adjusted under 35 U.S.C. 154(b) by 0 days.

(21) Appl. No.: 15/662,208

(22) Filed: Jul. 27, 2017

(65) Prior Publication Data
US 2018/0040281 A1 Feb. 8, 2018

(30) Foreign Application Priority Data
Aug. 8, 2016 (TW) .............................. 105125154 A

(51) Int. Cl.
*G09G 5/00* (2006.01)
*G09G 3/34* (2006.01)
(Continued)

(52) U.S. Cl.
CPC ......... *G09G 3/3406* (2013.01); *G02B 5/0231* (2013.01); *G02B 5/045* (2013.01);
(Continued)

(58) Field of Classification Search
CPC ................... G09G 3/3406; G09G 3/20; G09G 2320/0626; G09G 2300/026;
(Continued)

(56) References Cited

U.S. PATENT DOCUMENTS 7,134,778 B2  11/2006  Kazuhiro et al.
9,612,468 B1  4/2017  Liu et al.
(Continued)

FOREIGN PATENT DOCUMENTS

CN  1661444 A  8/2005
CN  201502963 U  6/2010
(Continued)

*Primary Examiner* — Adam R. Giesy

(57) ABSTRACT

Display apparatus with multi screens and corresponding display signal control method are provided. The display apparatus with multi screens includes a plurality of display screens arranged adjacent one by one and a prismatic structure optical element. At least two adjacent display screens of the plurality of display screens have an included angle between 90-180 degrees. Each display screen includes a display area and a frame surrounding the display area. The prismatic structure optical element is arranged between the two adjacent display screens with the included angle and to cover two adjacent side edges of the frames of the two adjacent display screens and a portion of the two display areas. The prismatic structure optical element includes a base and a plurality of prisms disposed on the base and arranged adjacent one by one. An extension direction of the prism is substantially parallel to the two adjacent side edges.

14 Claims, 10 Drawing Sheets

(51) Int. Cl.
*G02B 5/04* (2006.01)
*G02F 1/1333* (2006.01)
*G06F 3/14* (2006.01)
*G09G 3/20* (2006.01)
*G02B 5/02* (2006.01)

(52) U.S. Cl.
CPC ........ *G02F 1/13336* (2013.01); *G06F 3/1446* (2013.01); *G09G 3/20* (2013.01); *G09G 2300/026* (2013.01); *G09G 2320/0626* (2013.01); *G09G 2320/0686* (2013.01)

(58) Field of Classification Search
CPC ........ G09G 2320/0686; G02F 1/13336; G02B 5/045; G06F 3/1446
See application file for complete search history.

(56) References Cited

U.S. PATENT DOCUMENTS

| | | | |
|---|---|---|---|
| 9,851,480 | B2 | 12/2017 | Liu et al. |
| 2003/0231144 | A1 | 12/2003 | Cho et al. |
| 2004/0071417 | A1 | 4/2004 | Veligdan |
| 2009/0059366 | A1 | 3/2009 | Imai |
| 2010/0277665 | A1* | 11/2010 | Kuo .................. G02F 1/13336 349/58 |
| 2011/0164200 | A1* | 7/2011 | Watanabe .......... G02F 1/13336 349/58 |
| 2014/0218971 | A1 | 8/2014 | Wu |
| 2015/0092442 | A1 | 4/2015 | Wu |
| 2015/0116852 | A1 | 4/2015 | Kim et al. |
| 2017/0131583 | A1 | 5/2017 | Liu et al. |
| 2017/0131584 | A1 | 5/2017 | Liu et al. |

FOREIGN PATENT DOCUMENTS

| | | |
|---|---|---|
| CN | 101206327 B | 11/2011 |
| CN | 102346326 A | 2/2012 |
| CN | 102637388 A | 8/2012 |
| CN | 102854644 A | 1/2013 |
| CN | 202837794 U | 3/2013 |
| CN | 101593473 B | 6/2013 |
| CN | 203644317 U | 6/2014 |
| CN | 103988118 A | 8/2014 |
| CN | 105100658 A | 11/2015 |
| CN | 102087814 B | 4/2016 |
| JP | 2008060061 A | 3/2008 |
| JP | 2013195458 A | 9/2013 |
| TW | 200541334 A | 12/2005 |
| TW | 200846774 A | 12/2008 |
| TW | M358323 U | 6/2009 |
| TW | 200938913 A | 9/2009 |
| TW | 201319685 A1 | 5/2013 |
| TW | 201341864 A | 10/2013 |
| TW | 201403177 A | 1/2014 |
| TW | 201432351 A | 8/2014 |
| TW | 201447836 A | 12/2014 |
| TW | 201513074 A | 4/2015 |
| TW | I507787 B | 11/2015 |
| WO | 2010124542 A1 | 11/2010 |
| WO | 2013134621 A1 | 9/2013 |
| WO | 2015133488 A1 | 9/2015 |

* cited by examiner enlarge the display brightness in the first portion of the display area in the display screen covered by the prismatic structure optical element relative to that in the second portion ~S110

DISPLAY APPARATUS WITH MULTI SCREENS AND DISPLAY SIGNAL CONTROL METHOD THEREOF

CROSS-REFERENCE TO RELATED APPLICATION

This application claims the priority benefit of TW105125154 field on 2016 Aug. 8. The entirety of the above-mentioned patent application is hereby incorporated by reference herein and made a part of this specification.

FIELD OF THE INVENTION

The invention relates to a display apparatus, and more particularly to a display apparatus with multi screens and a display signal control method thereof.

BACKGROUND OF THE INVENTION

It is known that display apparatus with multi screens can provide much higher convenience. Through a display apparatus with multi screens, more information can be obtained at the same time from the multi screens and thereby achieving multiplex effect of quick analysis and integration. Therefore, display apparatus with multi screens has been widely used in some particular industries, such as equity securities industry. In general work, the use of the multi screens also improves the work efficiency. In addition, when the multi screens have outputs simultaneously, user can adjust the size of the display image by himself/herself and enjoy the different visual perception. Moreover, most of the current high-end graphics card support the multi-screen output; therefore, user can assemble the multi screens according to his/her desire after purchasing the multi screens and enjoy the display images with higher quality. In addition, multi-screen is also popular in the entertainment market, especially to the video game players.

In the display industry, curved screen is one of the key development projects. Because having the curved surface design, curved screen makes viewer have immersive visual experience, feel like being in a surround vision with zero degrees and feel a more-vivid visual effect when the image has a larger depth or viewing distance gets closer.

However, both of the flat screen and the curved screen include a frame surrounding the display area. Therefore, when multi screens are assembled to one unit, the frames in the jointing position may affect the viewing quality.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide a display apparatus with multi screens capable of improving the display quality affected by the frames of the display screens.

Another objective of the invention is to provide a display signal control method for improving the issues of having uneven brightness in the aforementioned display apparatus with multi screens.

In order to achieve one or a portion of or all of the objectives or other objectives, an embodiment of the invention provides a display apparatus with multi screens, which includes a plurality of display screens and a prismatic structure optical element. The plurality of display screens are arranged adjacent one by one. At least two adjacent display screens of the plurality of display screens have an included angle, and the included angle is greater than 90 degrees and smaller than 180 degrees. Each of the plurality of display screens includes a display area and a frame surrounding the display area. The prismatic structure optical element is arranged between the two adjacent display screens with the included angle and disposed to cover two adjacent side edges of the two frames of the two adjacent display screens and a portion of the two display areas in the two adjacent display screens. The prismatic structure optical element includes a base and a plurality of prism s. The plurality of prism s are disposed on the base and arranged adjacent one by one. An extension direction of each of the plurality of prism s is substantially parallel to the two adjacent side edges.

In order to achieve one or a portion of or all of the objectives or other objectives, an embodiment of the invention further provides a display signal control method for the aforementioned display apparatus with multi screens. The display signal control method includes a step of: enlarging a display brightness in a first portion of the display area in each one of the plurality of the display screens covered by the prismatic structure optical element relative to a display brightness in a second portion, wherein the second portion is defined as the display area excluded the first portion.

In summary, the display apparatus with multi screens of the embodiment of the invention has a prismatic structure optical element for covering two adjacent side edges of two frames of two adjacent display screens and a portion of the two display areas in the two adjacent display screens. The prismatic structure optical element directs the light emitting out from the display area covered by the prismatic structure optical element to a viewer's eyes, so that the viewer is not easy to observe the frames between the two respective adjacent display screens and the prismatic structure optical element when the two adjacent display screens are configured to display a united image corporately. As a result, the display quality of the display apparatus with multi screens is improved. In addition, the disposition of the prismatic structure optical element may lead to an uneven brightness in the display image. Therefore, the display signal control method of the embodiment of the invention is for enlarging the display brightness in the first portion of the display area in the display screen covered by the prismatic structure optical element relative to that in the second portion defined as the display area excluded the first portion. As a result, the uniformity of the display image is improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
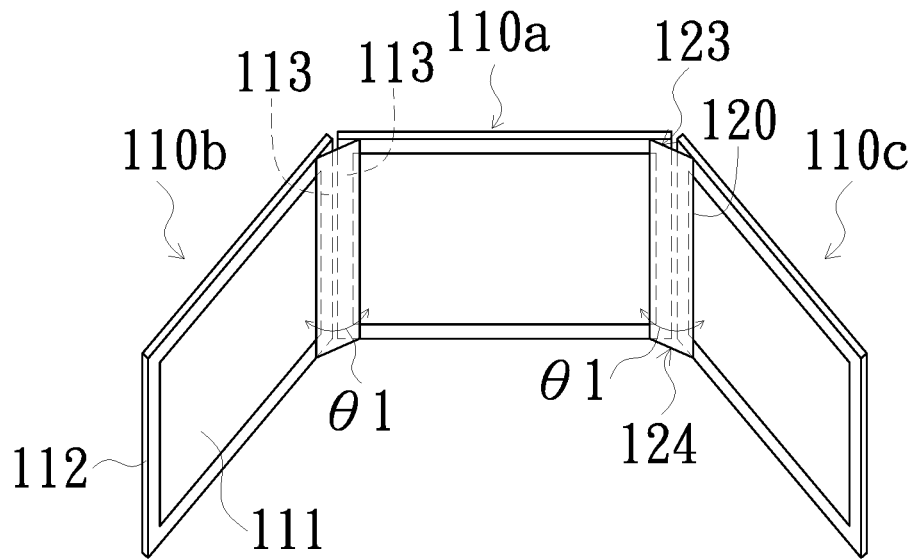
FIG. 1 is a schematic diagram of a display apparatus with multi screens in accordance with an embodiment of the invention.

FIG. 1 is a schematic diagram of a display apparatus with multi screens in accordance with an embodiment of the invention. As shown in FIG. 1, the display apparatus with multi screens 100 of the embodiment includes a prismatic structure optical element 120 and a plurality of display screens, wherein three display screens 110a, 110b and 110c are exemplarily shown in FIG. 1. The display screens 110a, 110b and 110c are arranged adjacent sequentially and at least two adjacent display screens of the three display screens 110a, 110b and 110c have an included angle θ1; wherein the included angle θ1 is greater than 90 degrees and smaller than 180 degrees. In the embodiment, the two adjacent display screens 110a and 110b have the included angle θ1 therebetween and the two adjacent display screens 110a and 110c also have the included angle θ1 therebetween. The angle of the included angle θ1 may be determined according to the various design requirements. For example, the included angle θ1 is 130 degrees in one embodiment. Each of the display screens 110a, 110b and 110c includes a display area 111 and a frame 112 surrounding the display area 111. In the embodiment, the display screens 110a, 110b and 110c may be implemented by various types of display screens, such as liquid crystal display screens and organic light-emitting diode display screens, and the invention is not limited thereto. In addition, the display screens 110a, 110b and 110c may be flat display screens or curved surface display screens.

The prismatic structure optical element 120 is disposed between the two respective adjacent display screens with the included angle θ1. For example, the prismatic structure optical element 120 is disposed between the two adjacent display screens 110a and 110b and/or between the two adjacent display screens 110a and 110c. Namely, the quantity of the prismatic structure optical elements 120 may be one or more than one. In one embodiment, any two adjacent display screens with the included angle θ1 are disposed with the prismatic structure optical element 120 therebetween. In another embodiment, the disposition of the prismatic structure optical element 120 between the two adjacent display screens with the included angle θ1 is optional and selectively disposed based on the actual design requirements. For example, the prismatic structure optical element 120 may be disposed between the two adjacent display screens 110a and 110b but not between the two adjacent display screens 110a and 110c. In addition, each prismatic structure optical element 120 is disposed to cover the two adjacent side edges 113 of the two frames 112 of the two respective adjacent display screens and a portion of the two respective display areas 111. As shown in FIG. 1, for example, the prismatic the structure optical element 120 corresponding to the two adjacent display screens 110a and 110b is disposed to cover the two adjacent side edges 113 of the two frames 112 of the two adjacent display screens 110a and 110b and a portion of the two display areas 111 in the two adjacent display screens 110a and 110b; and the prismatic the structure optical element 120 corresponding to the two adjacent display screens 110a and 110c is disposed to cover the two adjacent side edges 113 of the two frames 112 of the two adjacent display screens 110a and 110c and a portion of the two display areas 111 in the two adjacent display screens 110a and 110c.

Figure 2:
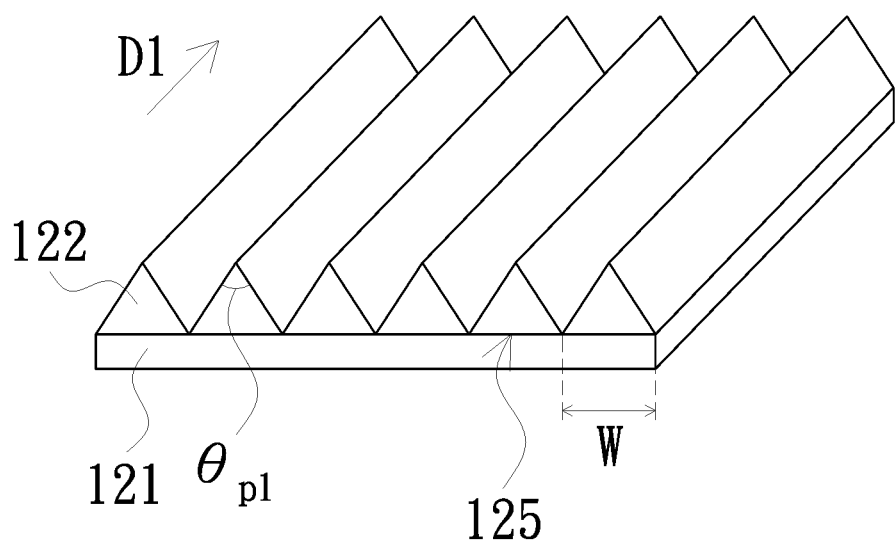
FIG. 2 is a schematic diagram of the prismatic structure optical element in FIG. 1.

FIG. 2 is a schematic diagram of the prismatic structure optical element in FIG. 1. Please refer to FIG. 1 and FIG. 2 together. The prismatic structure optical element 120 includes a base 121 and a plurality of prisms 122 disposed on the base 121 and adjacent sequentially. The extension direction D1 of each prism 122 is substantially parallel to the two adjacent side edges 113 of the two respective frames 112 covered by the prismatic structure optical element 120. Namely, each prism 122 extends from the upper end 123 to the lower end 124 of the prismatic structure optical element 120 in FIG. 1. In addition, the extension direction D1 of each prism 122 is parallel to the longitudinal side edge of the respective display area 111. In addition, the base 121 has a carrying surface 125 relatively away from the two respective adjacent display screens (for example, relatively away from the two adjacent display screens 110a and 110b or relatively away from the two adjacent display screens 110a and 110c); namely, the carrying surface 125 faces the viewer. The prisms 122 are disposed on the carrying surface 125. The base 121 in the embodiment may be a film; but the specific shape of the base 121 is not limited in the invention. In addition, the prism 122 in the embodiment may be an isosceles triangle prism. Specifically, the top angle $\theta p1$ of the isosceles triangle prism is relatively away from the base 121; that is, the top angle $\theta p1$ is opposite to the base 121 and not connected to the carrying surface 125 of the base 121. The angle of the top angle $\theta p1$ may be determined according to the various design requirements. The width W of the prism 122 is about dozens of micrometers (pin). In one embodiment, the width W of the prism 122 is in a ranged from 25 μm to 100 μm, such as 50 μm.

Figure 3:
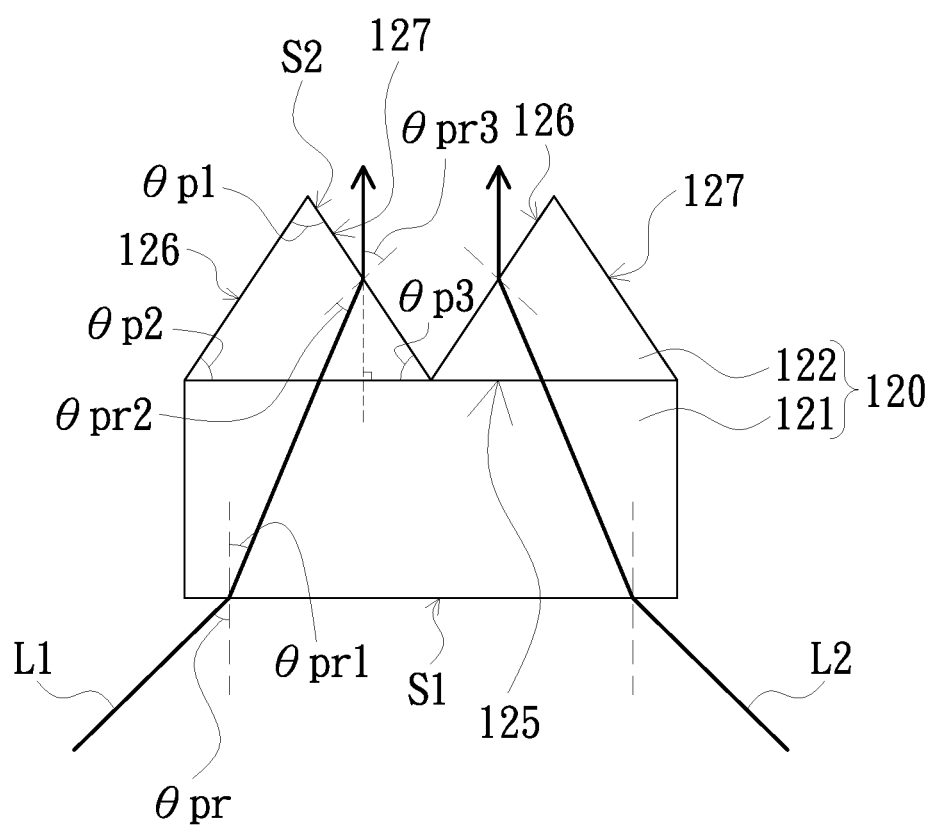
FIG. 3 is a schematic diagram illustrating a prismatic structure optical element and its related refractive lights in accordance with an embodiment of the invention.

An exemplary embodiment is taken for describing how to design the specific size and disposing angle of the prismatic structure optical element 120 according to various design requirements as follow; however, the invention is not limited thereto. FIG. 3 is a schematic diagram of a prismatic structure optical element and its related refractive lights in accordance with an embodiment of the invention. In FIG. 3, $\theta pr$ denotes the angel of incidence of the light L1 on the surface S1; $\theta p1$ denotes the top angle of the prism 122 (e.g., an isosceles triangle prism); $\theta p2$ and $\theta p3$ denote the two bottom angles of the prism 122 (e.g., an isosceles triangle prism); $\theta pr1$ denotes the angel of departure of the light L1 on the surface S1; $\theta pr2$ denotes the angel of incidence of the light L1 on the surface S2; and $\theta pr3$ denotes the angel of departure of the light L1 on the surface S2. In addition, Np denotes the refractive index of the prismatic structure optical element 120 and Na denotes the refractive index of air. In the embodiment, it is assumed that $\theta pr$ is the angle that configuring the light L1 to have a forward light emission after being refracted by the prismatic structure optical element 120 (that is, the light L1 is perpendicular to the carrying surface 125 when emitting out from the prismatic structure optical element 120).

In the embodiment, $\theta p2=\theta p3$ and $\theta p1=180-\theta p2-\theta p3$ due to that the prism 122 is an isosceles triangle prism, therefore, $\theta p3=(180-\theta p1)/2$.

In the embodiment, $\theta pr3=\theta p3$ and $Np \times \sin(\theta pr2)=Na \times \sin(\theta pr3)$ according to the Snell's Law, therefore, $\theta pr2=a\sin(Na \times \sin(\theta pr3)/Np)$.

In the embodiment, $\theta pr1=\theta p3-\theta pr2$ and $Np \times \sin(\theta pr1)=Na \times \sin(\theta pr)$ according to the Snell's Law, therefore, $\theta pr=a\sin(Np \times \sin(\theta pr1)/Na)$.

By summarizing the aforementioned equations, it is obtained that $\theta pr=a\sin(Np \times \sin((180-\theta p1)/2-(a\sin(Na \times \sin((180-\theta p1)/2)/Np)))/Na)$. Therefore, $\theta pr$ is 26.8 degrees when $\theta p1$ is 90 degrees, Na=1 and Np=1.52.

Figure 4A:
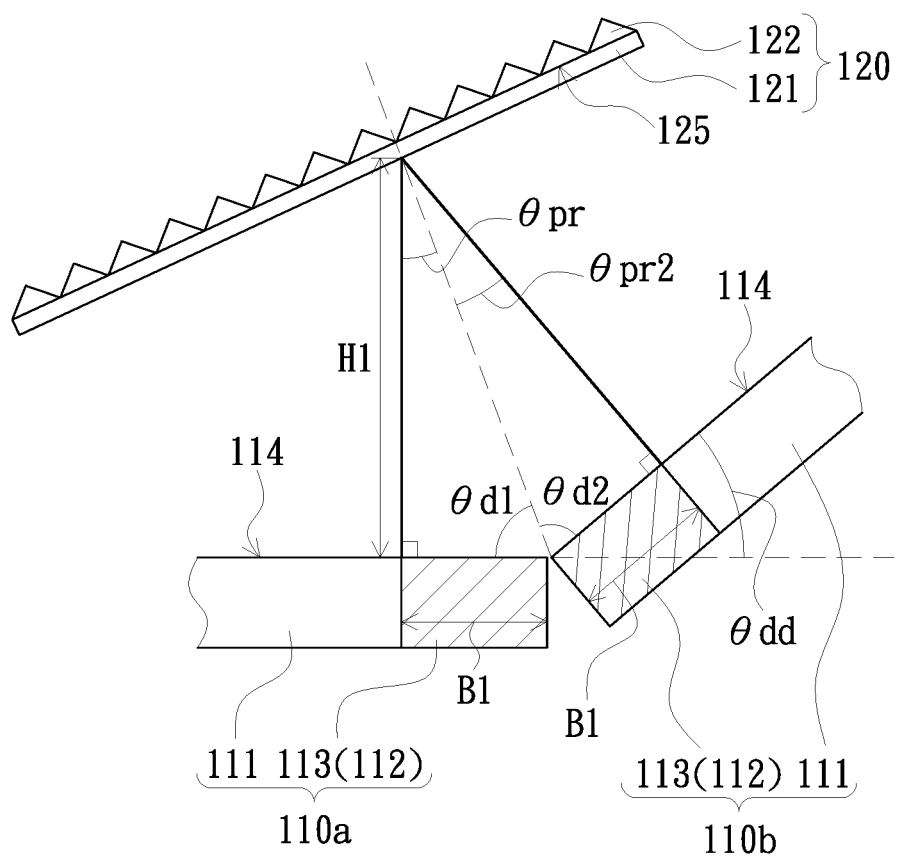
FIG. 4A and FIG. 4B are schematic diagrams for illustrating a process of designing the size and disposing angle of a prismatic structure optical element in accordance with an embodiment of the invention.
Figure 4B:
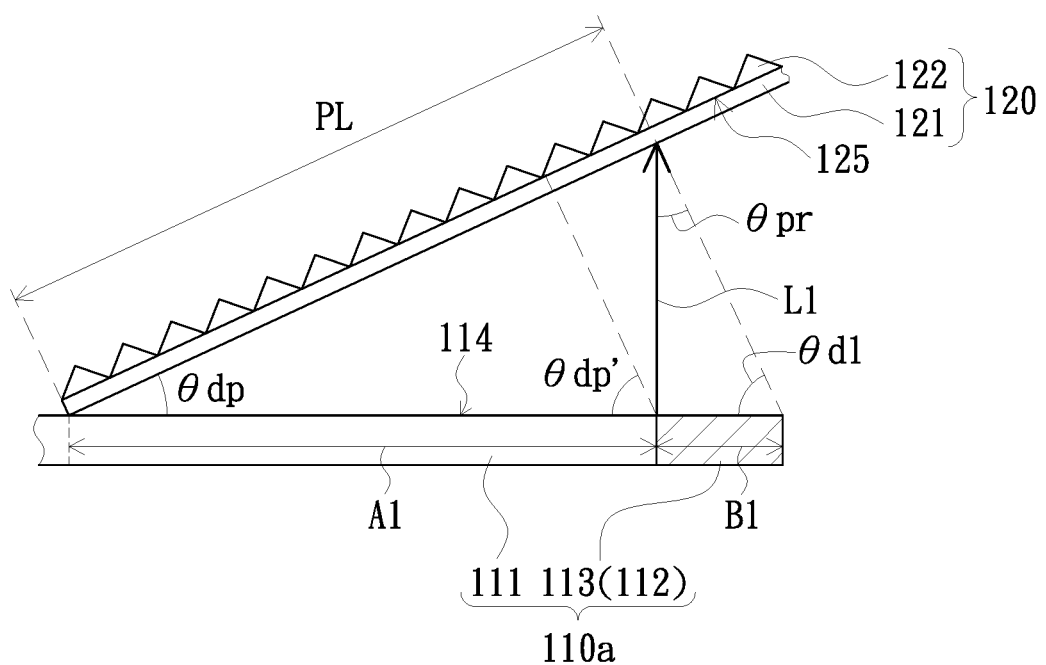

According to the above derivations, it is to be noted that if the portion of the forward light in the display area 111 (that is, the light perpendicularly emitting out from the display area 111) covered by the prismatic structure optical element 120 in FIG. 1 emits into the prismatic structure optical element 120 with the angle $\theta pr$, the light still has the forward light emission after being refracted by and emitting out from the prismatic structure optical element 120 (that is, the light is perpendicular to the carrying surface 125 when emitting out from the prismatic structure optical element 120). According to the condition, the size and disposing angle of the prismatic structure optical element 120 can be further derivate. FIG. 4A and FIG. 4B are schematic diagrams for illustrating a design of the size and disposing angle of a prismatic structure optical element in accordance with an embodiment of the invention. In FIG. 4A and FIG. 4B, $\theta d1$ denotes the included angle between the display screen 110a and the normal direction of the carrying surface 125 of the base 121 in the prismatic structure optical element 120; $\theta d2$ denotes the included angle between the display screen 110b and the normal direction of the carrying surface 125 of the base 121 in the prismatic structure optical element 120; $\theta dp$ denotes the included angle between the display screen 110a and the prismatic structure optical element 120; B1 denotes the width of the broadside 113 of the board 112 of each of the display screens 110a and 110b; A1 denotes the width of the display area 111 in the display screen 110a covered by the prismatic structure optical element 120; PL denotes a half of the width of the prismatic structure optical element 120; $\theta dd$ denotes the included angel between the light-exiting surface 114 of the display area 111 in the display screen 110b and the light-exiting surface 114 of the display area 111 in the display screen 110a; $\theta dp'$ denotes the included angle between the normal direction of the carrying surface 125 of the base 121 in the prismatic structure optical element 120 and the light-exiting surface 114 of the display area 111 in the display screen 110a; and H1 denotes the distance of the junction of the display area 111 and the broadside 113 of the display screen 110a to the prismatic structure optical element 120 along the normal direction of the display area 111 in the display screen 110a. According to FIG. 4A and FIG. 4B, the following equations are derived: $\theta d1=90-\theta pr$, $H1=B1/\tan(\theta pr)$, $\theta dd=180-\theta d1-\theta d2$, $\theta dp'=90-\theta pr$, $\theta dp=90-\theta dp'$, $A1=H1/\tan(\theta dp)$ and $PL=A1/\cos(\theta dp)$. And consequently the following equations are derived: $\theta dd=2 \times \theta pr$, $A1=B1/\tan(\theta pr)^2$ and $PL=B1\tan(\theta pr)^2/\cos(\theta pr)$. In one embodiment, if B1 is 4 millimeters (mm) and $\theta pr$ is 26.8 degrees, then it is obtained that $\theta dd$ is 53.6 degrees, A1 is 15.68 mm and PL is 17.57 mm.

According to the above embodiments, the invention can design a prismatic structure optical element qualified for various requirements according to the specifications of the display screens, the material of the prismatic structure optical element and some parameters such as the shape and angel of the prism. As shown in FIG. 3, if the light L1 is the light perpendicularly emitting out from the light-exiting surface 114 of the display screen 110a in FIG. 4A and the light L2 is the light perpendicularly emitting out from the light-exiting surface 114 of the display screen 110b in FIG. 4A, the prismatic structure optical element 120 can be designed to allow the lights L1 and L2 to still have the forward light emission (that is, the lights L1 and L2 are perpendicular to the carrying surface 125 when emitting out from the prismatic structure optical element 120) after passing through the prismatic structure optical element 120.

Figure 5:
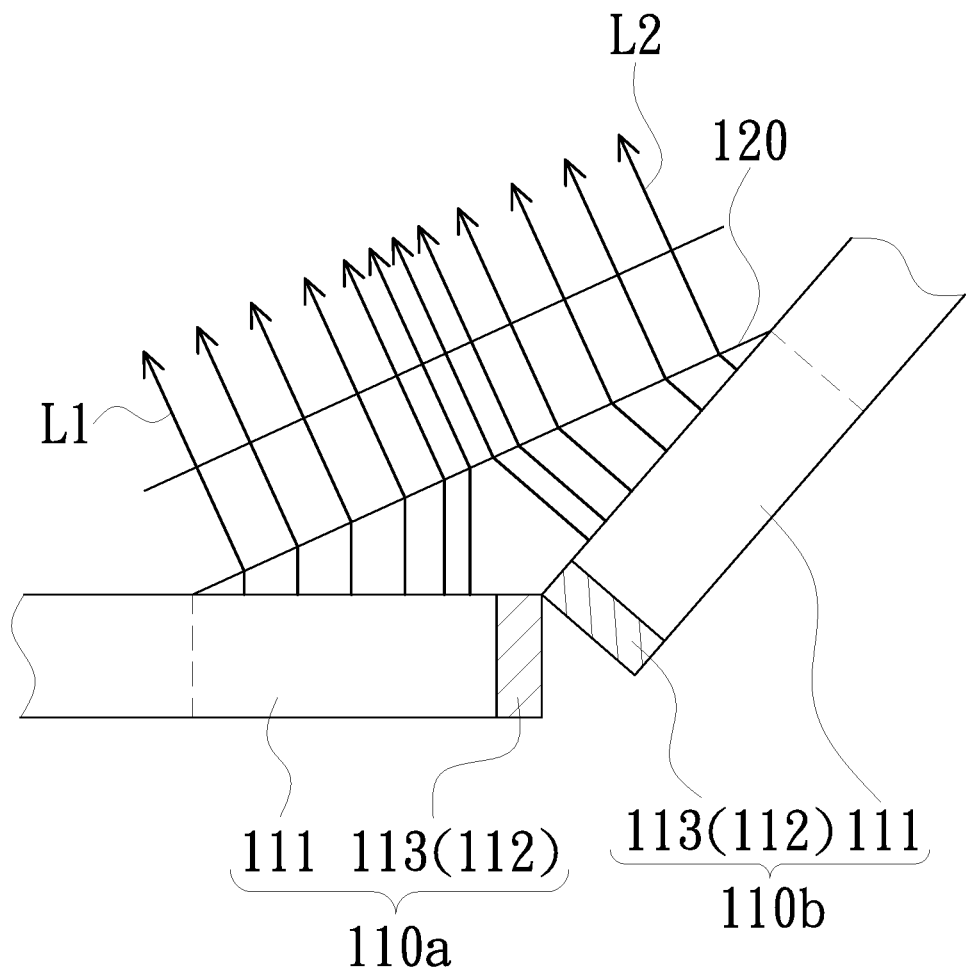
FIG. 5 is a schematic diagram illustrating the optical paths of the forward lights of two adjacent display screens pass through a prismatic structure optical element in accordance with an embodiment of the invention.

FIG. 5 is a schematic diagram illustrating the optical paths of the forward lights of two adjacent display screens after passing through a prismatic structure optical element in accordance with an embodiment of the invention. As shown in FIG. 5, the prismatic structure optical element 120 refracts the lights L1 and L2 perpendicularly emitting out from the two display areas 111 in the two respective display screens 110a and 110b; and the lights L1 and L2 still have the forward light emission after passing through the prismatic structure optical element 120. Through the refraction of the prismatic structure optical element 120, the area corresponding to the two adjacent side edges 113 of the two frames 112 of the two respective adjacent display screens 110a and 110b also has the lights L1 and L2 emitting towards the viewer; and consequently, the viewer will not observe the two adjacent side edges 113 of the two frames 112 of the two respective adjacent display screens 110a and 110b. Therefore, when the two adjacent display screens 110a and 110b display a united image corporately, the viewer can observe a well jointed image with a display quality without being affected by the frames 112. Based on the same manner, the display quality of the two adjacent display screens 110a and 110c is prevented from being affected by the frames 112 thereof due to the prismatic structure optical element 120 is also disposed between the two adjacent display screens 110a and 110c.

Please refer to FIG. 3 and FIG. 5 together. As shown, each prism 122 has two light-exiting surfaces 126 and 127. Because the majority of the portion of the light L1 perpendicularly emitting out from the display area 111 in the display screen 110a covered by the prismatic structure optical element 120 emits out from the light-emitting surfaces 127 of the prisms 122, the light emitting out from the light-emitting surfaces 126 of the prisms 122 corresponding to the display area 111 in the display screen 110a may not have an energy as large as the light corresponding to the respective light-emitting surfaces 127 has. Similarly, because the majority of the portion of the light L2 perpendicularly emitting out from the display area 111 in the display screen 110b covered by the prismatic structure optical element 120 emits out from the light-emitting surfaces 126 of the prisms 122, the light emitting out from the light-emitting surfaces 127 of the prisms 122 corresponding to the display area 111 in the display screen 110b may not have an energy as large as the light corresponding to the respective light-emitting surfaces 126 has. As a result, the display brightness may be affected.

Figure 6:
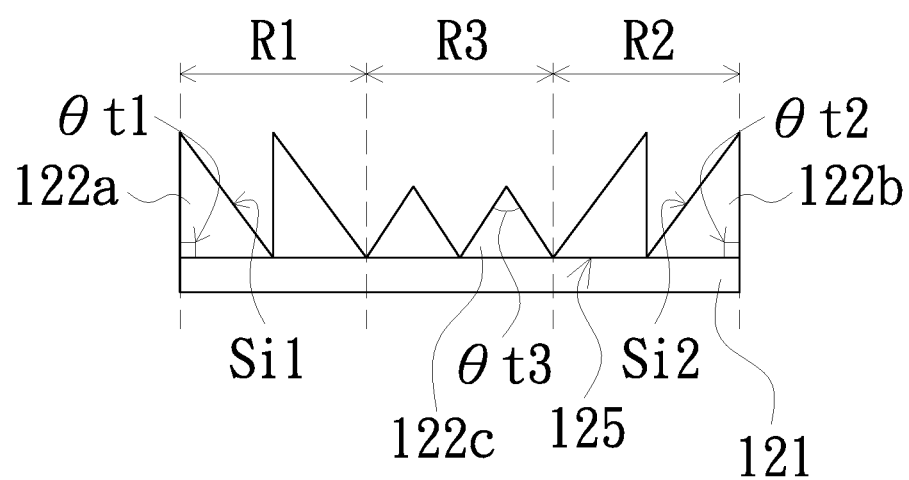
FIG. 6 is a schematic diagram of a prismatic structure optical element of a display apparatus with multi screens in accordance with another embodiment of the invention.

In order to increase the display brightness, the invention further provides another embodiment of a prismatic structure optical element. FIG. 6 is a schematic diagram of a prismatic structure optical element of a display apparatus with multi screens in accordance with another embodiment of the invention. As shown in FIG. 6, the base 121 of the prismatic structure optical element 120a of the embodiment includes a first region R1, a second region R2 and a third region R3 located between the first region R1 and the second region R2. Specifically, the third region R3 is located corresponding to the two adjacent side edges 113 of the two respective frames 112 in FIG. 4A; and the first region R1 and the second region R2 are located corresponding to the portions of the two display areas 111 in the two respective adjacent display screens 110a and 110b covered by the prismatic structure optical element 120 in FIG. 4A. Namely, by taking FIG. 4A as an example, the first region R1 corresponds to a portion of the display area 111 in the display screen 110a and the second region R2 corresponds to a portion of the display area 111 in the display screen 110b.

The prisms of the prismatic structure optical element 120a include a plurality of first right triangle prisms 122a disposed in the first region R1, a plurality of second right triangle prisms 122b disposed in the second region R2 and a plurality of isosceles triangle prisms 122c disposed in the third region R3. Each of the first right triangle prisms 122a has a first right triangle θt1 and a first slope Si1 corresponding to the first right triangle θt1. The first slope Si1 is tilting relative to the carrying surface 125 of the base 121 and faces the third region R3. Each of the second right triangle prisms 122b has a second right triangle θt2 and a second slope Si2 corresponding to the second right triangle θt2. The second slope Si2 is tilting relative to the carrying surface 125 of the base 121 and faces the third region R3. The top angle θt3 of each of the isosceles triangle prisms 122c is relatively away from the base 121.

In the embodiment, because the orthographic projections of the first slopes Si1 of the adjacent first right triangle prisms 122a on the carrying surface 125 are connected sequentially, the forward light emitting out from the first slopes Si1 (that is, the light perpendicular to the carrying surface 125) can cover the entire first region R1. Similarly, because the orthographic projections of the second slopes Si2 of the adjacent second right triangle prisms 122b on the carrying surface 125 are connected sequentially, the forward light emitting out from the second slopes Si2 (that is, the light perpendicular to the carrying surface 125) can cover the entire second region R2. As a result, the display brightness is increased. As described above, a plurality of isosceles triangle prisms 122c are disposed in the third region R3. Because the isosceles prism 122c can refract the forward light emitting out from any one of the two adjacent display screens to the viewer, the two adjacent display screens can still display a well jointed image corporately when the position of the prismatic structure optical element 120a has a bias resulted by the assembling tolerance.

Figure 7:
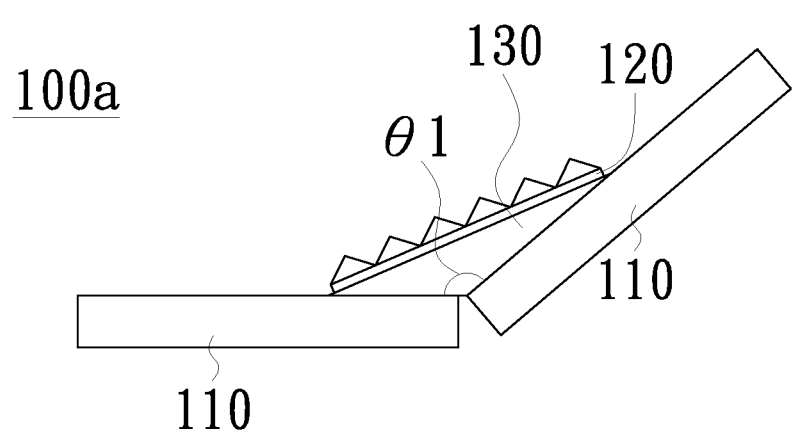
FIG. 7 is a schematic diagram of a display apparatus with multi screens in accordance with another embodiment of the invention.

FIG. 7 is a schematic diagram of a display apparatus with multi screens in accordance with another embodiment of the invention. The display apparatus with multi screens 100a in the embodiment of FIG. 7 is similar to the display apparatus with multi screens 100 in the embodiment of FIG. 1; that is, in the embodiment the prismatic structure optical element 120 is disposed between the two adjacent display screens 110 with an included angle θ1. In the embodiment, the display apparatus with multi screens 100a further includes a carrying prism 130 disposed between the prismatic structure optical elements 120 and the two adjacent display screens 110 corresponding to the prismatic structure optical element 120. The carrying prism 130 is relied on the two adjacent display screens 110 and carries the prismatic structure optical element 120; but the invention is not limited thereto. The carrying prism 130 may carry the prismatic structure optical element 120 by other structural designs. Therefore, the carrying prism 130 facilitates the fixing of the prismatic structure optical element 120 relative to the two adjacent display screens 110, and thereby improving the assembling convenience of the display apparatus with multi screens 100a. In other embodiments, if the quantity of the display screens 110 is relatively large and a relatively-large quantity of the prismatic structure optical elements 120 is required accordingly, the carrying prism 130 may be disposed between each of the prismatic structure optical elements 120 and the two respective adjacent display screens 110. In addition, it is understood that the prismatic structure optical element 120 in FIG. 7 may be replaced by the prismatic structure optical element 120a in FIG. 6.

Figure 8:
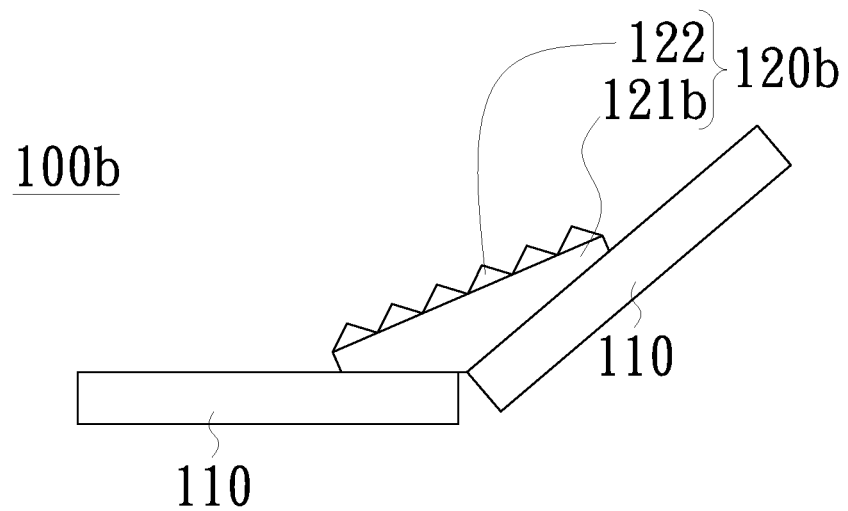
FIG. 8 is a schematic diagram of a display apparatus with multi screens in accordance with another embodiment of the invention.

FIG. 8 is a schematic diagram of a display apparatus with multi screens in accordance with another embodiment of the invention. The display apparatus with multi screens 100b in the embodiment of FIG. 8 is similar to the display apparatus with multi screens 100a in the embodiment of FIG. 7. A difference lies in that the base 121b in the prismatic structure optical element 120b of the embodiment is a carrying prism and the base 121b is relied on the two adjacent display screens 110 and carries the prisms 122. The prism s 122 are disposed on the base 121b; and the prisms 122 and the base 121b may have an integral forming structure. In addition, it is understood that the base 121 of the prismatic structure optical element 120a in FIG. 6 may be replaced by the base 121b of the embodiment in FIG. 8.

Figure 9:
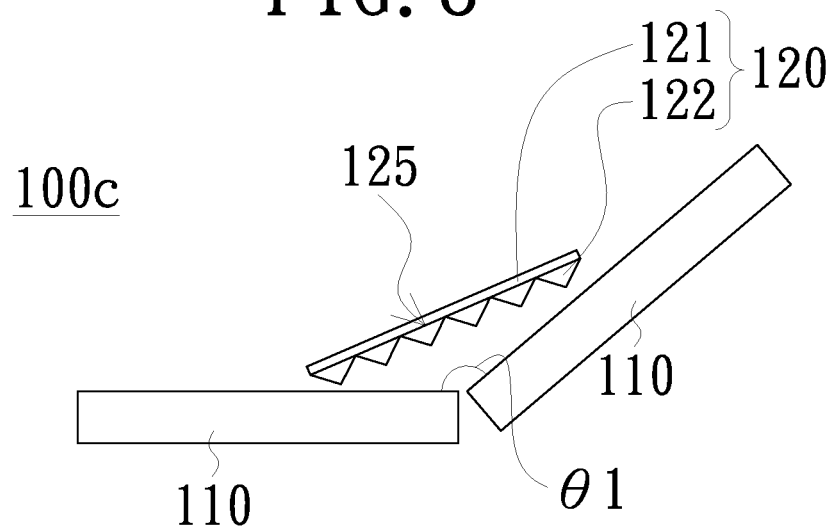
FIG. 9 is a schematic diagram of a display apparatus with multi screens in accordance with another embodiment of the invention.

FIG. 9 is a schematic diagram of a display apparatus with multi screens in accordance with another embodiment of the invention. The display apparatus with multi screens 100c in the embodiment of FIG. 9 is similar to the aforementioned display apparatus with multi screens 100; that is, in the embodiment the prismatic structure optical element 120 is disposed between the two adjacent display screens 110 with an included angle θ1. In the embodiment, the carrying surface 125 of the base 121 in the prismatic structure optical element 120 faces the two adjacent display screens 110 and the prisms 122 are disposed on the carrying surface 125.

Figures 10, 11:
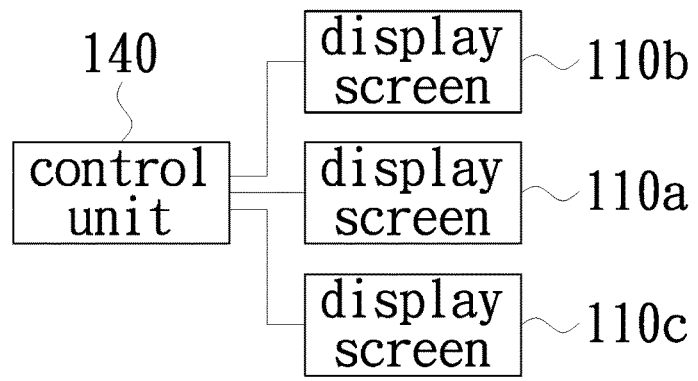
FIG. 10 is a circuit block diagram of a display apparatus with multi screens in accordance with an embodiment of the invention.
FIG. 11 is a view of a display signal control method in accordance with an embodiment of the invention.

FIG. 10 is a circuit block diagram of a display apparatus with multi screens in accordance with an embodiment of the invention. As shown in FIG. 10, the display apparatus with multi screens 100 in FIG. 1 further includes a control unit 140 electrically connected to the display screens 110a, 110b and 110c. The control unit 140 may be electrically connected to an external device (such as a computer, not shown) and configured to receive a display signal from the external device and control the display screens 110a, 110b and 110c to display images according to the received display signal. The control unit 140 may control the display screens 110a, 110b and 110c to display respective images individually or control the display screens 110a, 110b and 110c to display a united image with a larger size corporately (that is, an image jointed by three individual images of the respective display screens 110a, 110b and 110c). In another embodiment, the external device may be electrically connected to the display screens 110a, 110b and 110c and configured to control the display screens 110a, 110b and 110c to display respective images individually or control the display screens 110a, 110b and 110c to display a united image with a larger size corporately.

Figure 12:
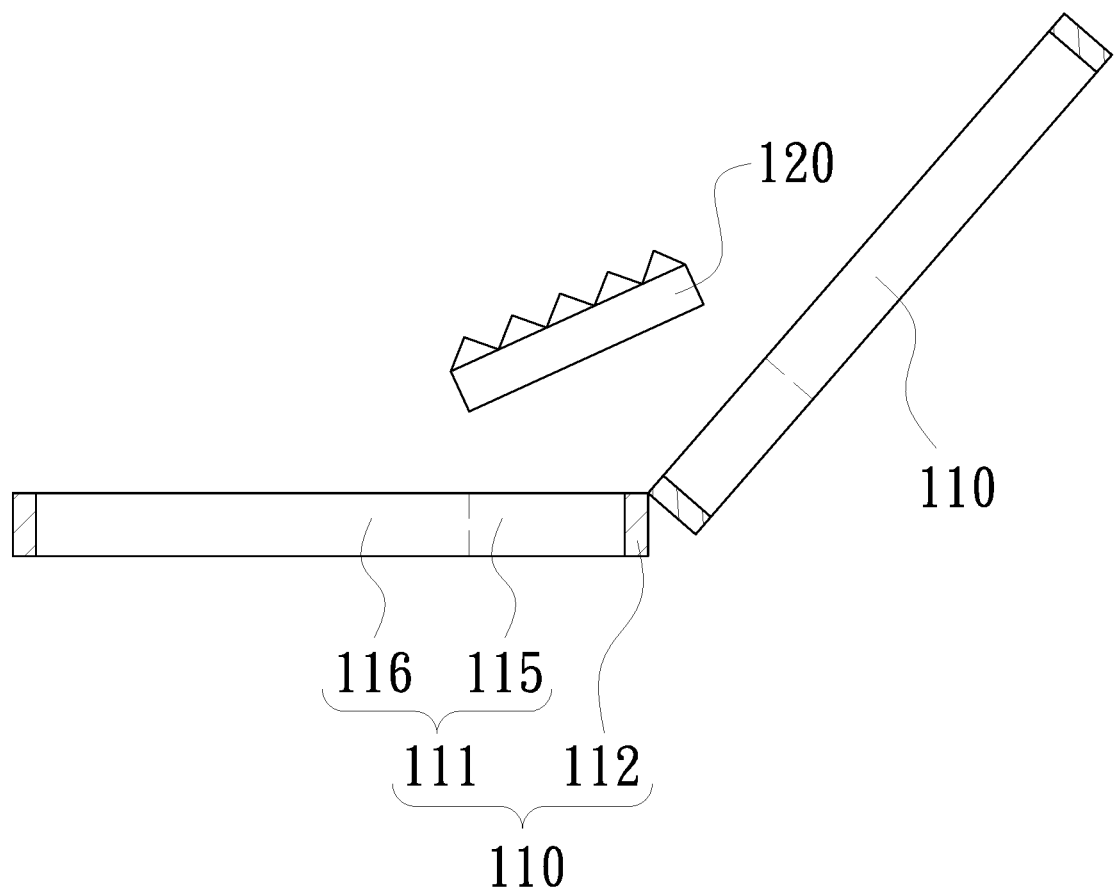
FIG. 12 is a schematic diagram of a display apparatus with multi screens in accordance with another embodiment of the invention.

FIG. 11 is a view of a display signal control method in accordance with an embodiment of the invention. FIG. 12 is a schematic diagram of a display apparatus with multi screens in accordance with another embodiment of the invention. Please refer to FIG. 11 and FIG. 12 together. The display signal control method is adapted to the display apparatus with multi screens in each of the above embodiment. The display signal control method of the embodiment includes a step S110 of: enlarging the display brightness in the first portion 115 of the display area 111 in the display screen 110 covered by the prismatic structure optical element 120 relative to that in the second portion 116, wherein the second portion 116 is defined as the display area 111 excluded the first portion 115. Therefore, the situation of the viewer may observe the brightness of the image corresponding to the first portion 115 relatively lower than that corresponding to the second portion 116 resulted by the prismatic structure optical element 120 is improved. In one embodiment, the step of enlarging the display brightness in the first portion 115 relative to that in the second portion 116 is implemented by increasing the display brightness in the first portion 115 10%-50% (e.g., 30%) greater than that in the second portion 116.

In one embodiment, the method of enlarging the display brightness in the first portion 115 relative to that in the second portion 116 is implemented by decreasing the grayscale in the second portion 116. For example, the grayscale in the second portion 116 may decrease to 10%-50% (e.g., 30%) lower than the original signal. In another embodiment, the method of enlarging the display brightness in the first portion 115 relative to that in the second portion 116 is implemented by increasing the grayscale in the second first portion 115. For example, the grayscale in the first portion 115 may increase to 10%-50% (e.g., 30%) higher than the original signal.

Figure 13:
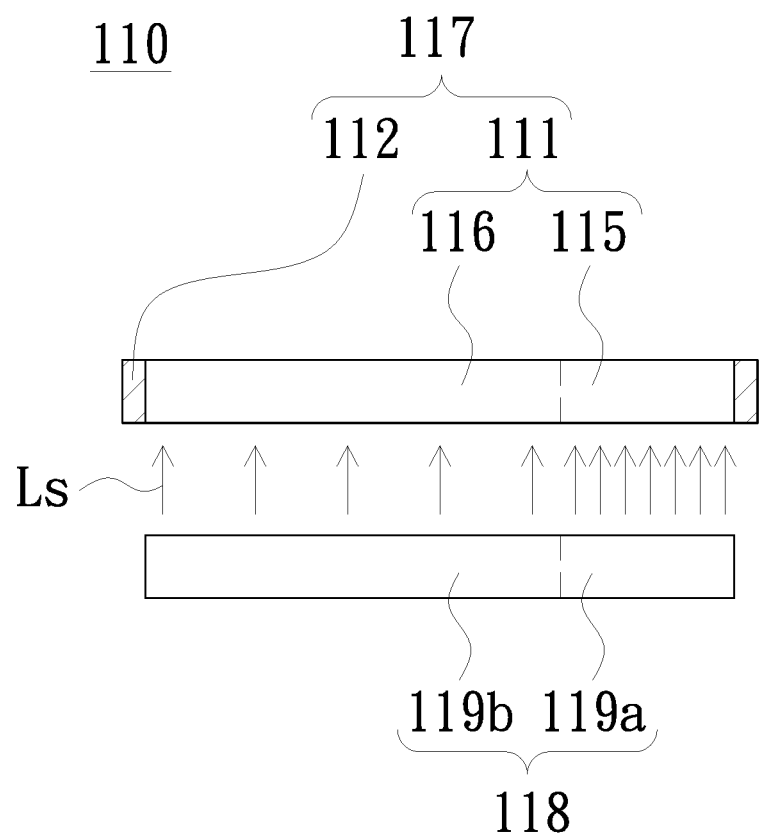
FIG. 13 is a schematic diagram of a display screen of a display apparatus with multi screens in accordance with an embodiment of the invention.

FIG. 13 is a schematic diagram of a display screen of a display apparatus with multi screens in accordance with an embodiment of the invention. As shown in FIG. 13, each of the display screens 110 in the embodiment includes a non-self-luminous display panel 117 and a backlight module 118 configured to provide a display light source Ls to the non-self-luminous display panel 117. The non-self-luminous display panel 117 may be a liquid crystal display panel, but the invention is not limited thereto. The aforementioned method of enlarging the display brightness in the first portion 115 relative to that in the second portion 116 may be implemented by increasing the brightness of the display light source Ls corresponding to the first portion 115. Specifically, the backlight module 118 includes a first area 119a corresponding to the first portion 115 and a second area 119b corresponding to the second portion 116. Therefore, the method of increasing the brightness of light source Ls corresponding to the first portion 115 may be implemented by increasing the quantity of the light emitting elements (not shown) or increasing the driving currents of the light emitting elements in the first area 119a.

In another embodiment, the aforementioned method of enlarging the display brightness in the first portion 115 relative to that in the second portion 116 may be implemented by decreasing the brightness of display light source Ls corresponding to the second portion 116. Specifically, the method of decreasing the brightness of display light source Ls corresponding to the second portion 116 may be implemented by decreasing the quantity of the light emitting elements or decreasing the driving currents of the light emitting elements in the second area 119b.

In still another embodiment, the aforementioned method of enlarging the display brightness in the first portion 115 relative to that in the second portion 116 may be implemented by decreasing the brightness of display light source Ls corresponding to the second portion 116 and increasing the brightness of display light source Ls corresponding to the first portion 115.

Please refer to FIG. 12 again. The prismatic structure optical element 120 in the embodiment as well as the prismatic structure optical elements in other embodiment is demountable. That is, the prismatic structure optical element 120 is disposed between the two respective adjacent display screens 110 only when the display screens 110 are required to display a united image with a larger size corporately. Accordingly, before performing step S110 of FIG. 11, the display signal control method may first determine whether the display screens 110 are configured to display a united image corporately; and then step S110 is performed if yes.

In summary, the display apparatus with multi screens of the embodiment of the invention has a prismatic structure optical element for covering two adjacent side edges of two frames of two adjacent display screens and a portion of the two display areas in the two adjacent display screens. The prismatic structure optical element directs the light emitting out from the display area covered by the prismatic structure optical element to a viewer's eyes, so that the viewer is not easy to observe the frames between the two respective adjacent display screens and the prismatic structure optical element when the two adjacent display screens are configured to display a united image corporately. As a result, the display quality of the display apparatus with multi screens is improved. In addition, the disposition of the prismatic structure optical element may lead to an uneven brightness in the display image. Therefore, the display signal control method of the embodiment of the invention is for enlarging the display brightness in the first portion of the display area in the display screen covered by the prismatic structure optical element relative to that in the second portion. As a result, the uniformity of the display image is improved.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A display apparatus with multi screens, comprising:
    a plurality of display screens arranged adjacent one by one, wherein at least two adjacent display screens of the plurality of display screens have an included angle, the included angle is greater than 90 degrees and smaller than 180 degrees, and each of the plurality of display screens comprises a display area and a frame surrounding the display area; and
    a prismatic structure optical element arranged between the two adjacent display screens with the included angle and disposed to cover two adjacent side edges of the two frames of the two adjacent display screens and a portion of the two display areas in the two adjacent display screens, wherein the prismatic structure optical element comprises a base and a plurality of prisms, wherein the base has a carrying surface facing away from the two adjacent display screens, the plurality of prisms are disposed on the carrying surface and arranged adjacent one by one, and an extension direction of each of the plurality of prisms is substantially parallel to the two adjacent side edges.

2. The display apparatus with multi screens according to claim 1, wherein the base is a film.

3. The display apparatus with multi screens according to claim 2, further comprising:
    a carrying prism disposed between the prismatic structure optical element and the two adjacent display screens corresponding to the prismatic structure optical element, wherein the carrying prism is relied on the two adjacent display screens and carries the prismatic structure optical element.

4. The display apparatus with multi screens according to claim 1, wherein the base is a carrying prism, and the base is relied on the two adjacent display screens and carries the plurality of prisms.

5. The display apparatus with multi screens according to claim 1, wherein each of the plurality of prisms is an isosceles triangle prism and a top angle of the isosceles triangle prism is relatively away from the base.

6. The display apparatus with multi screens according to claim 1, wherein the base of the prismatic structure optical element comprises a first region, a second region and a third region, the third region is located between the first region and the second region and corresponding to the two adjacent side edges of the two frames of the two adjacent display screens, the first region and the second region are located corresponding to portions of the two display areas in the two adjacent display screens covered by the prismatic structure optical element, the plurality of prisms of the prismatic structure optical element comprise a plurality of first right triangle prisms disposed in the first region, a plurality of second right triangle prisms disposed in the second region and a plurality of isosceles triangle prisms disposed in the third region, each of the plurality of first right triangle prisms has a first right triangle and a first slope corresponding to the first right triangle, the first slope is tilting relative to the carrying surface and faces the third region, each of the plurality of second right triangle prisms has a second right triangle and a second slope corresponding to the second right triangle, the second slope is tilting relative to the carrying surface and faces the third region, and a top angle of each of the plurality of isosceles triangle prisms is relatively away from the base.

7. The display apparatus with multi screens according to claim 1, wherein a quantity of the plurality of display screens is three and a quantity of the prismatic structure optical element is two.

8. The display apparatus with multi screens according to claim 1, further comprising a control unit electrically connected to the plurality of display screens.

9. A display signal control method for the display apparatus with multi screens claimed in claim 1, and the display signal control method comprises a step of:

enlarging a display brightness in a first portion of the display area in each one of the plurality of the display screens covered by the prismatic structure optical element relative to a display brightness in a second portion, wherein the second portion is defined as the display area excluded the first portion.

10. The display signal control method according to claim 9, wherein the step of enlarging the display brightness in the first portion of the display area in each one of the plurality of the display screens covered by the prismatic structure optical element relative to the display brightness in the second portion is to increase the display brightness in the first portion 10%-50% greater than the display brightness in the second portion.

11. The display signal control method according to claim 9, wherein each of the plurality of display screens comprises a non-self-luminous display panel and a backlight module configured to provide a display light source to the non-self-luminous display panel, and the step of enlarging the display brightness in the first portion of the display area in each one of the plurality of the display screens covered by the prismatic structure optical element relative to the display brightness in the second portion is to increase a brightness of the display light source corresponding to the first portion.

12. The display signal control method according to claim 9, wherein each of the plurality of display screens comprises a non-self-luminous display panel and a backlight module configured to provide a display light source to the non-self-luminous display panel, and the step of enlarging the display brightness in the first portion of the display area in each one of the plurality of the display screens covered by the prismatic structure optical element relative to the display brightness in the second portion is to decrease a brightness of the display light source corresponding to the second portion.

13. The display signal control method according to claim 9, wherein the step of enlarging the display brightness in the first portion of the display area in each one of the plurality of the display screens covered by the prismatic structure optical element relative to the display brightness in the second portion is to decrease a grayscale in the second portion.

14. The display signal control method according to claim 9, wherein the step of enlarging the display brightness in the first portion of the display area in each one of the plurality of the display screens covered by the prismatic structure optical element relative to the display brightness in the second portion is to increase a grayscale in the first portion.

* * * * *